April 28, 1959 V. D. SNYDER 2,884,591
HIGH VACUUM LEAK DETECTOR
Filed June 25, 1952 2 Sheets-Sheet 1

INVENTOR.
Verne D. Snyder,
BY Wilkinson, Huxley,
Byron & Hume
ATTYS.

April 28, 1959      V. D. SNYDER      2,884,591
HIGH VACUUM LEAK DETECTOR
Filed June 25, 1952      2 Sheets-Sheet 2
*Fig. 5.*      *Fig. 4.*
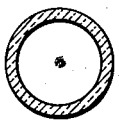
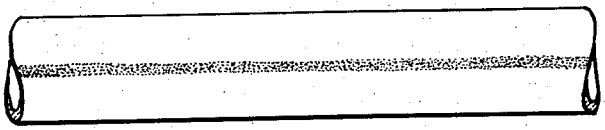
10 mm.
*Fig. 7.*      *Fig. 6.*
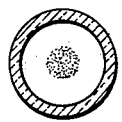
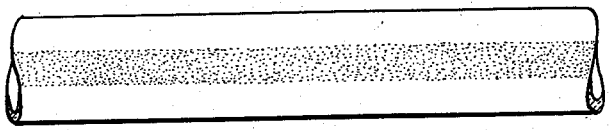
4 mm.
*Fig. 9.*      *Fig. 8.*
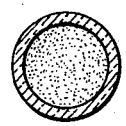
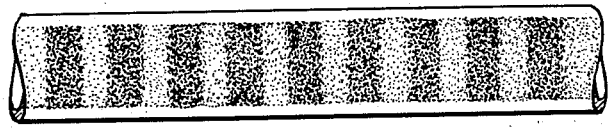
1 mm.
*Fig. 10.*
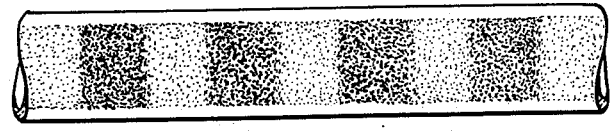
½ mm.
*Fig. 11.*
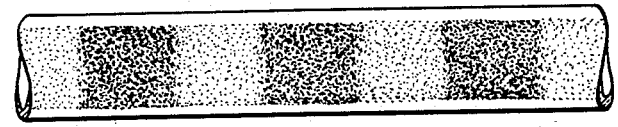
1/10 mm.
INVENTOR.
Verne D. Snyder,
BY Wilkinson, Huxley,
Byron + Hume

United States Patent Office 2,884,591
Patented Apr. 28, 1959

2,884,591

HIGH VACUUM LEAK DETECTOR

Verne D. Snyder, Chicago, Ill.

Application June 25, 1952, Serial No. 295,585

27 Claims. (Cl. 324—33)

This invention relates to a leak detector for high vacuum systems.

Several methods of vacuum leak detection have been developed in the past, but they are all of rather limited applicability. For example, a Tesla spark coil is convenient and effective in finding leaks in all glass vacuum systems, but this device is useless around a system containing metal parts. In addition there is always the danger of inadvertently enlarging a leak due to the heat effect and the dielectric stresses which exist when an indication of a leak in the form of a bright pin point of light is produced. Likewise when the spark coil is brought near a thin section of glass in the system dielectric stresses may actually puncture the glass and actually produce a leak.

The "Mass Spectograph" form of leak detector is a device which is capable of finding both very minute leaks and leaks of larger magnitude in almost any form of vacuum system. This form of detector is very expensive, however, costing about five thousand dollars at the present time. It also requires considerable operation and maintenance experience on the part of the operator in order for it to be used effectively. Other relatively expensive detectors have been developed, but no simple and relatively inexpensive device has been offered on the market, which is of any great utility.

For example, the use of helium as a probe gas along with a conventional electrical discharge tube disposed in communication with the system to be tested has sometimes been attempted. When the helium probe gas is directed at the location of a leak in the vacuum system, the discharge tube theoretically will display the characteristic color of a helium discharge tube, assuming of course that there is a flow of gas from leaking system through the discharge tube. This method is seriously limited in that it is capable of detecting a very minute leak, only if just one such minute leak is present in the system being tested. If the system has a plurality of minute leaks of essentially the same size, it is improbable that any of them will be successfully located. As a matter of fact, in order to find a leak by utilizing this method, it must be responsible for substantially 25% of the total leakage of the system. This is a very serious limitation.

Another method which has been utilized is that which incorporates the use of a very sensitive, continuously indicating vacuum gauge, together with a wad of cotton soaked in acetone or ether, or a jet of helium or hydrogen as a probe. A Pirani gauge with controlled temperature may be utilized for this purpose. When a leak is covered by the probe the pressure in the system will rise, due to the increased mobility, in the case of helium or hydrogen, or to the vaporization of the liquid after it enters the system, in the case of acetone or ether. This indication of pressure increase may be enhanced by the increased response of the Pirani gauge to these vapors. However, this method, even with refinements, is very slow, and is incapable of finding a leak unless that leak is responsible for not appreciably less than 25% of the total leakage of the system.

It is, therefore, an object of this invention to provide a leak detector for high vacuum systems which is relatively simple in construction and yet which will rapidly reveal the existence of both minute and large leaks; which is relatively inexpensive; which requires no extensive training or experience in either operation or maintenance to be used successfully; which may be designed so as to give both a visible and audible signal when a leak is detected; which utilizes any halogenated hydrocarbon vapor as a probe; and which is equally useful with all glass vacuum systems, and with systems which also incorporate metallic parts.

Further objects and advantages of this invention will become evident as the description proceeds and from an examination of the accompanying drawing which illustrates two embodiments of the invention and in which similar numerals refer to similar parts throughout the several views.

In the drawings:

Figure 4 is a fragmentary view of a portion of the discharge tube shown in Figure 1 showing the type of glow discharge which will occur at a pressure of approximately 10 millimeters of mercury;

Figure 5 is a view in vertical cross section of the portion of the tube shown in Figure 4;

Figure 6 is a view similar to Figure 4 showing the type of glow discharge at a reduced pressure;

Figure 7 is a view in vertical cross section of the tube shown in Figure 6;

Figure 8 is a view similar to Figure 4 showing the type of glow discharge at a reduced pressure;

Figure 9 is a view in vertical cross section of the tube shown in Figure 8;

Figure 10 is a view similar to Figure 4 showing the type of glow discharge at a further reduced pressure; and Figure 11 is a view similar to Figure 4 showing the type of glow discharge at a still further reduced pressure.

Figure 1:
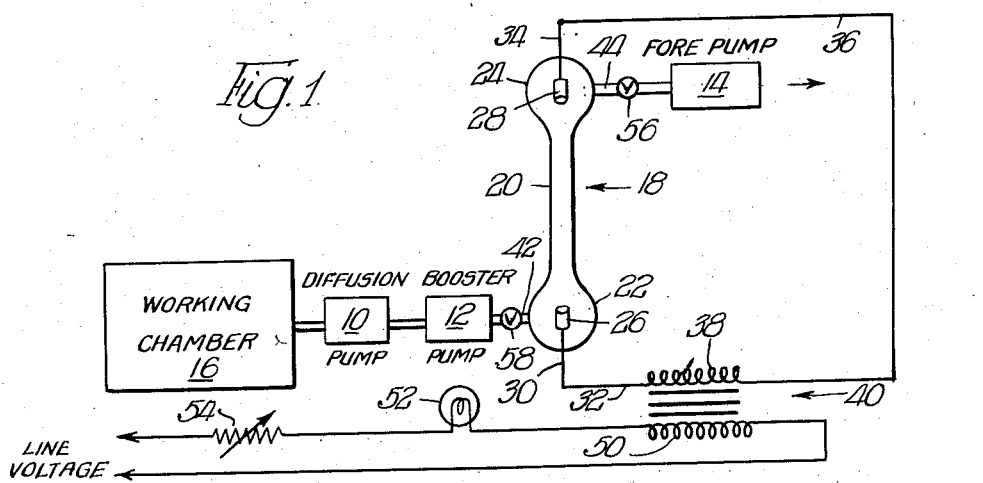
Figure 1 is a somewhat diagrammatic representation of one form of leak detector incorporating the invention including the electrical circuit thereof, the detector being connected as an integral part of an existing vacuum system.

Referring now to Figure 1, a vacuum system is disclosed therein having a conventional diffusion pump 10, a conventional booster pump 12, and a conventional fore-pump 14, for maintaining the desired vacuum in the working chamber 16. Connected as an integral part of the vacuum system between the booster pump and the fore-pump is the gaseous discharge tube, indicated generally by the numeral 18, having a central portion 20 of reduced diameter and being provided with enlarged bulb-like portions 22 and 24, respectively, at each end. The bulb 22 has connected thereto a vacuum conduit 42 having its opposite end connected to the booster pump 12 and, likewise, the bulb 24 has a vacuum conduit 44 connected thereto, the opposite end of which is connected to the mechanical pump or fore-pump 14.

The electrodes 26 and 28 are disposed in the bulb portions 22 and 24, respectively, and may be preferably formed of nickel. The electrode 26 has the electrical conduit 30 connected thereto which passes through an airtight seal in the wall in the bulb 22 and is connected to the electrical conduit 32. Similarly, the electrode 28 in the bulb 24 is provided with the electrical conduit 34 which passes through an air-tight seal in the wall of the bulb 24 and is connected to the electrical conduit 36. The conduits 32 and 36 are in turn connected to the secondary winding 38 of the high voltage transformer 40.

The dimensions of the gaseous discharge tube 18 are not critical, although they will have an effect on the voltage and the current necessary for optimum operation. It may, for example, have an overall length of between approximately 20 and 25 centimeters. The bulbs 22 and 24 may be substantially spherical with a diameter of approximately 5 centimeters. The connecting central portion 20 may have a diameter of approximately 1 centimeter and may be from approximately 8 to 10 centimeters long.

The high voltage transformer 40 may take the form of a small transformer capable of delivering approximately 15 to 20 milliamperes of current at a voltage up to 2,500 volts, such as a conventional small neon sign transformer. The primary circuit of the transformer is preferably connected to a 115 volt, 60 cycle alternating current line, and it has been found desirable to have a suitable current limiting resistor in series with the primary 50 of the high voltage transformer such as the lamp 52 as well as a variable resistor 54.

The desirable working range is from 10 to 25 milliamperes since a higher current will give no increase in sensitivity and will shorten the tube life; while a lower current will reduce the sensitivity. Actually it is possible to operate the detector with as low a current as 3 milliamperes and as high a current as 50 milliamperes, but the desirable range is as stated. With regard to the voltage drop across the discharge tube, the tube has been found to operate satisfactorily when this voltage is within the range of 700 to 1500 volts.

The discharge tube 18 will perform as a leak detector at a pressure of from approximately 10 millimeters of mercury down to 50 microns, although its highest sensitivity is in the range from approximately 1½ millimeters to ½ millimeter of mercury with the maximum sensitivity at a pressure of the order of 1 millimeter. To attain this working pressure for the discharge tube it has been found desirable to place a stopcock 56 between this tube and the forepump, and a similar stopcock 58 between the tube and the booster pump. For a tube of the approximate dimensions previously mentioned for tube 18, the desired pressure will have been attained when 7 to 9 striations in the glow discharge are visible in the narrow portion 20 of the discharge tube 18 when no probe gas is present in the system.

Any halogenated hydrocarbon vapor can be used as a probe material in connection with the detector. Since the discharge tube is arranged at the outlet of the booster pump so that the whole flow of gas from the vacuum system being tested flows therethrough, the operation of the detector is not dependent upon mere diffusion of the probe vapor into the discharge tube. Of course, if desired, the discharge tube can be arranged as a side tube so that it will operate by the probe gas diffusing into it although the flow-through arrangement is generally more preferable.

An apparent reaction occurs between the probe gas or vapor and the nickel electrodes in the discharge tube under the excitation of the relatively high current in the tube (10 to 25 milliamperes) which produces a discharge glow of a brilliant green color in the tube. This phenomenon will hereafter be referred to in this specification as the "characteristic glow discharge." The green color of this discharge is quite distinct from the color of the discharge in a tube of this character which contains normal air at reduced pressure. The color of the discharge under the latter circumstances may be characterized best as a weak purple. It is therefore possible to utilize the leak detector of the character described by merely noting when the discharge glow in the tube 18 takes on a green color, since this is an indication that the probe gas is present in the discharge tube. Operation of the detector in this fashion is sufficient to detect approximately 1 part in 300 of the halogenated hydrocarbon vapor which for some uses is satisfactory.

However, the apparatus is capable of much more accurate determinations for which an additional characteristic novel to this device is utilized.

It has already been mentioned that for a tube of the approximate dimensions previously given for tube 18 in Figure 1 the most desirable operating pressure will have been attained when the glow discharge visible in the narrow portion 20 of the discharge tube contains 7 to 9 striations, when no probe gas is present in the system. Applicant has discovered that, in addition to the characteristic green color, an additional and even more significant change occurs in the character of the glow discharge when any halogenated hydrocarbon vapor is present. Assume, for example, that it has been found through experiment that tube 18 shown in Figure 1 at a pressure of 1 millimeter with no probe gas present has a glow discharge containing 9 striations, and that this is the maximum number of striations that can be obtained at any pressure. Variations in the pressure within the dischareg tube in either direction will cause changes in the character of the glow discharge but in no case will such variations cause the number of striations to be greater than 9. The changes which occur as the pressure is changed in the discharge tube are illustrated by the somewhat diagrammatic representation shown in Figure 4 to 9. Figure 4, for example, showing a very narrow stringy discharge, is the type of glow discharge which quite probably will occur at a pressure of approximately 10 millimeters of mercury. Figure 5 is a somewhat diagrammatic view in cross section of this type of discharge. Figure 6, on the other hand, shows a solid glow discharge of substantially greater diameter than that shown in Figures 4 and 5, as shown in the sectional view in Figure 7, and is illustrative of the type of discharge which will probably occur at a pressure of approximately 4 millimeters of mercury. Figures 8 and 9 illustrate the type of discharge which will occur at the optimum pressure of approximately 1 millimeter of mercury. It will be seen that there are 9 striations present in the glow discharge and that the discharge is substantially of the same diameter as the reduced portion of the discharge tube.

If the pressure is reduced below the optimum pressure to, for example, ½ millimeter of mercury, the number of striations in the glow discharge become less than the optimum number of 9 as shown in Figure 10. A further reduction such as to 1/10 millimeter of mercury will normally reduce the number of striations even further, as shown in Figure 11.

Because of these characteristics of the type of discharge glow which will be obtained, proper manipulation of the stopcocks 56 and 58, as previously mentioned, can be carried out to attain the pressure which gives the discharge tube its maximum sensitivity. In the case of the tube just described, this pressure would be approximately 1 millimeter of mercury and would be attained by adjusting the stopcocks 56 and 58 until the discharge glow was of the character illustrated in Figure 8, namely, a glow containing 9 striations. When the tube has been so adjusted, large concentrations of probe gas entering the discharge will produce a brilliant green color in the central portion of the discharge tube in the form of a solid glow. Small concentrations of the probe gas entering the discharge tube, on the other hand, will produce an increase in the number of striations to a number greater than the normal number, or in other words, to more than 9 striations in the case of the tube illustrated.

Applicant has not attempted to advance any theoretical explanation of why the presence of the probe gas in relatively minute amounts causes the number of striations to increase to a figure greater than can ever be achieved in the absence of the probe gas, by any combination of pressure, current and voltage. Regardless of why it occurs, applicant has discovered that for a tube of particular dimensions and for any combination of current, voltage and pressure there is a maximum number of striations which can be obtained in the glow discharge. Therefore, if the tube is first adjusted so that this maximum number of striations is already present, before the leak detection process is instituted, then subsequently during the test any increase to a greater number of striations must necessarily be the result of the presence of probe gas in the discharge tube, and therefore it may be concluded that a leak is present.

As previously suggested, any halogenated hydrocarbon vapor can be used as a probe in detecting leaks in the system being tested. The probe may take the form of a wad of cotton soaked in carbon tetrachloride or the like. A more effective probe may be used in the form of a jet of dichlorodifluoromethane, commonly known as "Freon 12." The use of carbon tetrachloride as a probe material in connection with a discharge tube has heretofore been impractical, but when utilized with a discharge tube of the type described above having nickel electrodes and with a relatively high discharge current, as described, a very pronounced and useful reaction is obtained in the form of the green glow discharge.

Other probe materials which could be used are chloroform, "Freon 22" (monochlorodifluoromethane); the other substances sold under the name "Freon"; chlorinated hydrocarbons, generally such as dichlorethane and tetrachloroethane; and brominated hydrocarbons, generally such as dibromoethane and tetrabromoethane.

In experiments with a detector of the character just described applicant has determined that a single leak as small as one micron liter per hour can be detected. In a system containing many leaks, a leak as small as five micron liters per hour can be detected even though the total leakage of the system may be as much as three thousand times this amount. This degree of sensitivity should be considered adequate for any kinetic vacuum system up to and including the large electron microscope. It may not be adequate for the vacuum system of the betatron or the cyclotron, nor can it be used in a vacuum system which includes a mercury diffusion pump, or other source of mercury vapor, or halogenated hydrocarbons.

Although the detector as just described is very useful and suitable for most detection work, its performance can be enhanced in many instances by the addition of means for producing an audible signal, which means operates simultaneously and in conjunction with the discharge tube which is adapted to give a visible signal.

Figure 2:
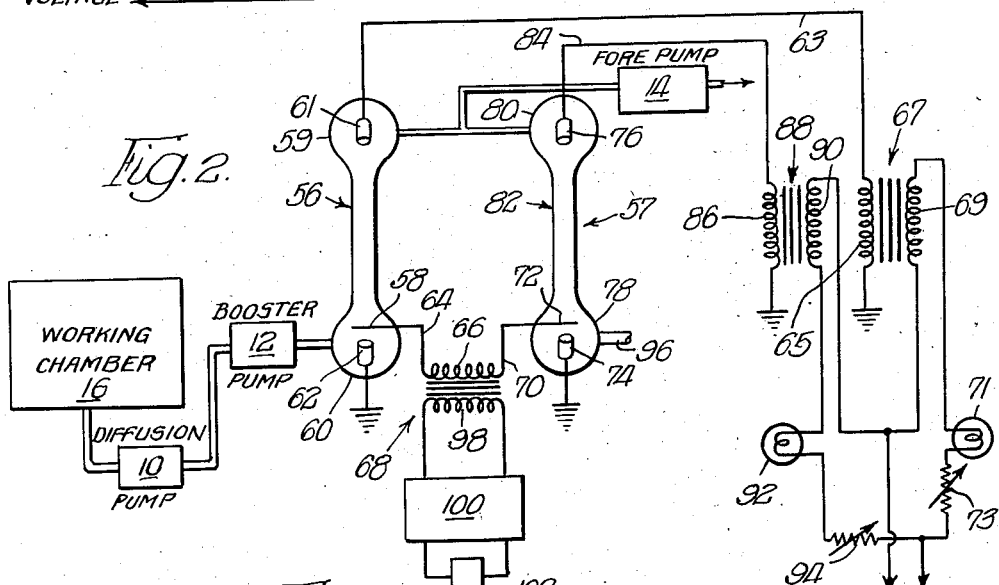
Figure 2 is a somewhat diagrammatic representation of another form of leak detector capable of giving both a visible and audible indication of a leak, which detector may also be used as an integral part of the vacuum system being checked.

One method of producing such an audible signal is shown in Figure 2 wherein dual discharge tubes 56 and 57 are shown in place of the single tube 18 in Figure 1. The discharge tube 56 has a third electrode 58 disposed in the bulb 60 adjacent the electrode 62 at one end in such a position that it is just within the cathode dark space, which is a phenomenon well known in the art in connection with discharge tubes. This third electrode 58 is electrically connected through the air-tight seal in the wall of the bulb 60 with the electrical conduit 64 which is, in turn, connected to the primary 66 of a suitable transformer 68. The opposite end of the tube 56 is provided with a bulb 59 similar to the bulb 24 in the tube 18. An electrode 61 is disposed therein which is connected through the conduit 63 to one side of the secondary 65 of the high voltage transformer 67 which transformer is similar to the transformer 40 previously mentioned. The opposite side of the winding 69 is grounded while the primary winding 69 is connected across the line voltage through the current limiting resistor 71 and the variable resistance 73. This third electrode may be formed of the same material as the principal electrode with which it is associated although any metal suitable for an electrode may be used.

The discharge tube 57 is substantially the same as the discharge tube 56 and is provided with the electrodes 74 and 76 comparable to the electrodes 26 and 28 of the tube 18, previously described. These electrodes are disposed in the bulbs 78 and 80 which, in turn, are comparable to the bulbs 22 and 24 of the tube 18. The bulbs 78 and 80 are connected by a central portion of reduced diameter 82 comparable to the portion 20 of the discharge tube 18. The electrode 74 is preferably connected through an airtight seal in the wall of the bulb 78 to ground, and the electrode 62 of the discharge tube 56 is likewise grounded. The electrode 76 in bulb 80 is connected through an air-tight seal in the wall thereof to the electrical conduit 84 which is, in turn, connected to one side of the secondary winding 86 of the high voltage transformer 88 which is comparable to the transformer 40 previously described. The opposite end of the secondary winding 86 is grounded, and the primary winding 90 is connected to the source of line voltage with a current limiting resistor 92 and a variable resistance 94 interposed between one side of the line and the primary winding 90, as previously described in connection with transformer 40. The side of the primary winding 66 of the transformer 68 not connected to the conduit 64 is connected to the third electrode 72 in the tube 57 by the conduit 70. These third electrodes 58 and 72 may be preferably either a point shape or a ring shape and, as previously stated are disposed so as to be just within the cathode dark space adjacent the cathode when the tube is energized but no probe gas is in the system. When probe gas enters the discharge tube, however, the cathode discharge space which is adjacent the dark space will move toward the cathode and will encompass the third electrode. This in turn will cause a change in electrical potential between the third electrode and the adjacent nickel electrode. The voltage between these adjacent electrodes may vary from 60 to 300 volts and this may have both an A.C. and D.C. component. For a tube of given dimensions the magnitude of this voltage will be dependent upon the voltage input to the transformer, the pressure of the gas within the discharge tube, and the nature of that gas.

If the input voltage is sufficiently constant and if the pressure within the discharge tube can be held substantially constant, then changes in the electrical potential between the third electrode and the adjacent nickel electrode will be brought about by changes in the nature of the gas within the tube. These changes in the voltage between these adjacent points can, of course, be utilized to cause a suitable signal to be produced by connecting a suitable amplifying element in series with the third electrode and the adjacent nickel electrode and utilizing the output of the amplifier to operate a buzzer or the like.

If two similar discharge tubes are used, each with its own transformer, and both tubes connected to the same mechanical forepump, but only one of them connected to the vacuum system being tested for leaks, as shown in Figure 2, an A.C. signal voltage of six volts or more can be obtained between the pair of third electrodes 58 and 72. Line voltage input variations are thus balanced out, in such an arrangement, and variations due to changes in pressure are also balanced out, leaving a real signal due to the presence of probe gas. It is necessary to provide a small leak of known value through the comparison tube to prevent diffusion of probe gas back into the comparison tube. A leak of the order of one to ten micron liters per minute has been found to be quite satisfactory. This form of arrangement is shown in Figure 2 in which the second or comparison discharge tube 57 is provided with a calibrated leak 96.

The output impedance of the pair of third electrodes 58 and 72 is rather high, and the power available from them is sufficient to operate a good volt meter or galvanometer with a rectifier, but obviously is not sufficient to operate a relay to ring a bell. Some form of amplification must be provided, ordinarily, in order to create an audible signal and one form of such arrangement is shown diagrammatically in Figure 2. The secondary 98 of the transformer 68 is connected to a conventional power amplifier 100, the output of which may be fed into a relay operated buzzer 102, or any similar device for producing an audible signal.

This method of creating an electrical impulse sufficient to produce an audible signal has been found to be unaffected by supply voltage changes from 70 to 130 volts. It has also been found to be operative within a pressure range in the discharge tubes of between approximately five millimeters and 250 microns of mercury.

Obviously other methods of amplifying the power available from the third electrodes 58 and 72 could be utilized. For example, the transformer 68 could be replaced with a pair of cathode followers with condenser input, if desired.

Both of the previously described forms of the detector have been shown as being incorporated in a vacuum system as an integral part thereof. They have been shown as being connected between the forepump and the booster pump. If used without the booster pump the operation will be slow, particularly with a large system, because the pressure within the system will of necessity be rather high. These two methods of application could be considered suitable for relatively small vacuum systems. For larger vacuum systems, however, it is desirable to have a complete unit such as that shown in Figure 3 which may be connected to the existing vacuum system to be tested so as to take sample gas therefrom. In order to make this sampling possible, regardless of the pressure existing within the system which is being tested, the detector is provided with a motor driven forepump, a booster pump and a diffusion pump of its own as shown in Figure 3, the diffusion pump of the detector being adapted to be connected between the diffusion pump and the forepump of the system to be tested.

Figure 3:
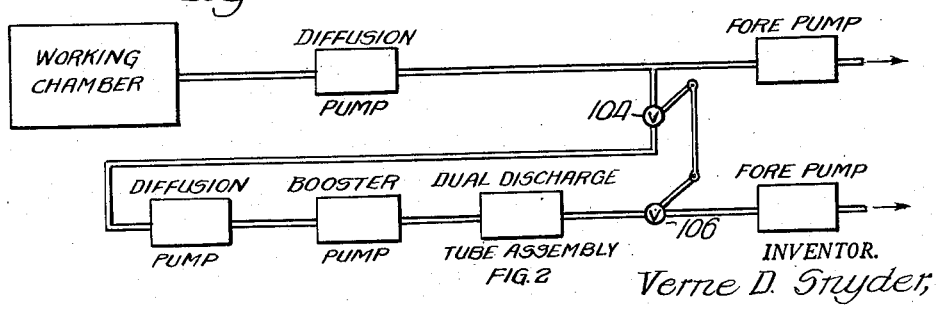
Figure 3 is a somewhat diagrammatic representation of still another form of leak detector incorporating the present invention which is adapted to produce both a visible and audible signal and which is connected to a vacuum system to be tested so as to take sample gas therefrom and not as an integral part thereof.

The dual discharge tube indicated in Figure 3, as a component of the detector, may have exactly the same form as the corresponding assembly shown in Figure 2, previously described in detail. The form of detector shown in Figure 3 may be provided at the input to its diffusion pump with a valve 104, and also at the output from the dual discharge tube assembly, with a valve 106. As indicated in Figure 3, these two valves may be ganged together so that as one is opened, the other one is closed. Such an arrangement will enable the operator to readily attain the desired operating pressure in the dual discharge tube assembly.

Although it has been stated in describing the specific embodiments disclosed herein that the electrodes in the discharge tubes are preferably of nickel it has also been found possible to utilize electrodes made of copper with almost equal success. As a matter of fact any metal which reacts with the probe gas in the manner indicated could be successfully utilized. Metals which have been found to be useful in the order of their desirability are: nickel, copper, cobalt, iron, silver, and gold.

In the drawings and specification, there has been set forth several embodiments of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

It is claimed:

1. A leak detector for high vacuum systems comprising an electrical discharge tube, a pair of spaced metallic electrodes in said tube formed of a material capable of reacting with a halogenated hydrocarbon probe gas to give a characteristic green glow discharge, means for delivering an electric current to said electrodes, means for causing a flow of gas from the vacuum system being checked for leaks through said discharge tube, a second electrical discharge tube in communication with said first named discharge tube, a second pair of spaced metallic electrodes in said second tube, a third electrode in each of said tubes disposed adjacent one of said spaced electrodes just within the cathode dark space normally adjacent thereto, said two electrodes associated with said third electrode being at ground potential, means for delivering an electric current to said second pair of spaced electrodes, means for maintaining the pressure within said discharge tubes between approximately 15 millimeters to 50 microns of mercury, and electrically operable means for giving a sensory perceptible signal when the magnitude of the potential difference between one of said third electrodes and its associated electrode differs from that between the other said third electrode and its associated electrode, said last named means being connected in series with said third electrodes.

2. A leak detector for high vacuum systems comprising an electrical discharge tube, a pair of spaced metallic electrodes in said tube being formed of a material capable of reacting with a halogenated hydrocarbon probe gas to give a characteristic green glow discharge when the pressure within said discharge tube is between approximately 15 millimeters to 50 microns of mercury, means for maintaining such a pressure within said discharge tube, means for delivering an electric current to said electrodes, means for causing a flow of gas from the vacuum system being checked for leaks through said discharge tube, a third electrode associated with one of said spaced electrodes just within the cathode dark space normally adjacent thereto, and electrically operable means associated with said third electrode for giving a sensory perceptible signal when the potential between the latter and its associated electrode is altered, said last named means being connected in series with said third electrode and its associated spaced electrode.

3. A leak detector for high vacuum systems comprising an electrical discharge tube, spaced metallic electrodes in said tube comprising at least one metal selected from the group consisting of nickel, copper, cobalt, iron, silver, and gold, means for maintaining the pressure within said discharge tube between approximately 15 millimeters to 50 microns of mercury, means for applying an alternating electric current of between approximately 10 to 25 milliamperes to said electrodes, probe means for directing a flow of a halogenated hydrocarbon vapor toward the possible sources of leakage in said high vacuum system, and means for causing a flow of gas from the vacuum system being checked for leaks through said discharge tube, so that any probe gas entering the vacuum system through a leak therein will be carried into said discharge tube and the discharge glow, which normally under the conditions described will be a weak purple, will assume a characteristic green color.

4. A leak detector for high vacuum systems comprising an elongated electrical discharge tube having a central portion of reduced diameter, metallic electrodes disposed at opposite ends of said discharge tube formed of a material capable of producing a weak purple glow discharge in normal air at a high vacuum but which will react with a halogenated hydrocarbon probe gas to produce a characteristic green glow discharge under such conditions when the pressure within said discharge tube is between approximately 15 millimeters to 50 microns of mercury, a booster pump connected to one end of said discharge tube, a diffusion pump connected to said booster pump, means for connecting said diffusion pump to the vacuum system being checked for leaks, a valve in said means, a mechanical pump connected to the opposite end of said discharge tube for maintaining the pressure within said discharge tube between approximately 15 millimeters to 50 microns of mercury, a second valve between said discharge tube and said mechanical pump, means for operating said first named and said second valves simultaneously so that as one is opened the other is closed, a source of alternating current capable of delivering to said electrodes a current of between approximately 10 and 25 milliamperes, and means for limiting the current flow in said discharge tube so that the voltage drop across said tube is between 700 to 1500 volts.

5. A leak detector for high vacuum systems comprising an elongated electrical discharge tube having a central portion of reduced diameter, a pair of metallic electrodes disposed at opposite ends of said discharge tube formed of a material capable of producing a weak purple, glow discharge in normal air at a high vacuum but which will react with a halogenated hydrocarbon probe gas to produce a characteristic green glow discharge under such conditions when the pressure within said discharge tube is between approximately 15 millimeters to 50 microns of mercury, a booster pump connected to one end of said discharge tube, a diffusion pump connected to said booster pump, means for connecting said diffusion pump to the vacuum system being checked for leaks, a mechanical pump connected to the opposite end of said discharge tube for maintaining the pressure within said discharge tube between approximately 15 millimeters to 50 microns of mercury, a source of alternating current capable of delivering to said electrodes a current of between approximately 10 and 25 milliamperes, means for limiting the current flow in said discharge tube, means for delivering an electric current to said electrodes, probe means for directing a flow of a halogenated hydrocarbon vapor toward the possible sources of leakage in said high vacuum system, means for causing a flow of gas from the vacuum system being checked for leaks through said discharge tube, a second electrical discharge tube having one end thereof connected between said first named discharge tube and said mechanical pump, means for venting the opposite end of said second discharge tube to the atmosphere through a calibrated leak, a second pair of metallic electrodes disposed at opposite ends of said second tube, a third metallic electrode in each of said tubes disposed adjacent one of said electrodes in each pair of metallic electrodes maintained at ground potential, said third electrode being also disposed just within the cathode dark space normally adjacent to said electrode maintained at ground potential, means for delivering an electric current to said second pair of spaced electrodes, means for maintaining the pressure within said first named discharge tube between approximately 15 millimeters to 50 microns of mercury, and electrically operable means for giving a sensory perceptible signal when the magnitude of the potential difference between one of said third electrodes and its associated electrode differs from that between the other said third electrode and its associated electrode, said last named means being connected between said third electrodes.

6. A leak detector for high vacuum systems comprising an elongated electrical discharge tube having a central portion of reduced diameter, a pair of metallic electrodes disposed at opposite ends of said discharge tube, said electrodes comprising at least one metal selected from the group consisting of nickel, copper, cobalt, iron, silver, and gold, a booster pump connected to one end of said discharge tube, a diffusion pump connected to said booster pump, means for connecting said diffusion pump to the vacuum system being checked for leaks, a mechanical pump connected to the opposite end of said discharge tube for maintaining the pressure within said discharge tube between approximately 15 millimeters to 50 microns of mercury, a source of alternating current capable of delivering to said electrodes a current of between approximately 10 and 25 milliamperes, means for limiting the current flow in said discharge tube, means for delivering an electric current to said electrodes, probe means for directing a flow of a halogenated hydrocarbon vapor toward the possible sources of leakage in said high vacuum system, means for causing a flow of gas from the vacuum system being checked for leaks through said discharge tube, a second electrical discharge tube having one end thereof connected between said first named discharge tube and said mechanical pump, means for venting the opposite end of said second discharge tube to the atmosphere through a calibrated leak, a second pair of metallic electrodes disposed at opposite ends of said second tube substantially identical to said first named pair, a third metallic electrode in each of said tubes disposed adjacent one of said electrodes in each pair of metallic electrodes maintained at ground potential, said third electrode being also disposed just within the cathode dark space normally adjacent to said electrode maintained at ground potential, means for delivering an electric current to said second pair of spaced electrodes, means for maintaining the pressure within said first named discharge tube between approximately 15 millimeters to 50 microns of mercury, and electrically operable means for giving a sensory perceptible signal when the magnitude of the potential difference between one of said third electrodes and its associated electrode differs from that between the other said third electrode and its associated electrode, said last named means being connected between said third electrodes.

7. A leak detector for high vacuum systems comprising an electrical discharge tube disposed in communication with said system, a pair of spaced metallic electrodes in said tube formed of a material capable of producing a weak purple, glow discharge in normal air when the pressure within said discharge tube is between approximately 15 millimeters to 50 microns of mercury, but which will react with a halogenated hydrocarbon probe gas to produce a characteristic green glow discharge under the same conditions, means for maintaining such a pressure within said discharge tube, means for delivering an electric current to said electrodes, a third electrode associated with one of said spaced electrodes just within the cathode dark space normally adjacent thereto, and means associated with said third electrode for giving a sensory perceptible signal when the potential between the latter and its associated electrode is altered.

8. The method of detecting leaks in a high vacuum system which comprises placing an electrical discharge tube in communication with said system, said tube having spaced metallic electrodes formed of a material capable of producing a weak purple, glow discharge having a maximum number of striations in normal air at a high vacuum but which will react with a halogenated hydrocarbon probe gas to produce a characteristic green glow discharge having an increased number of striations, applying an electric current to said electrodes, adjusting the pressure within said system until a maximum number of striations is present in said glow discharge and directing a stream of halogenated hydrocarbon probe gas into association with suspected portions of said high vacuum system, and observing any change in the color of said glow discharge and the number of striations therein.

9. The method of detecting leaks in a high vacuum system which comprises placing an electrical discharge tube in communication with said system, said tube having spaced metallic electrodes formed of a material capable of producing a weak purple, glow discharge having a maximum number of striations in normal air at a high vacuum but which will react with a halogenated hydrocarbon probe gas to produce a characteristic green glow discharge having an increased number of striations, applying an electric current to said electrodes of between approximately 10 to 25 milliamperes, adjusting the pressure within said system until a maximum number of striations is present in said glow discharge and directing a stream of halogenated hydrocarbon probe gas into association with suspected portions of said high vacuum system, and observing any change in the color of said glow discharge and the number of striations therein.

10. The method of detecting leaks in a high vacuum system which comprises placing an electrical discharge tube in communication with said system, said tube having spaced metallic electrodes formed of a material capable of producing a weak purple, glow discharge having a maximum number of striations in normal air at a high vacuum but which will react with a halogenated hydrocarbon probe gas to produce a characteristic green glow discharge having an increased number of striations when the pressure within said discharge tube is between approximately 15 millimeters to 50 microns of mercury, maintaining such a pressure within said vacuum system, applying an electric current to said electrodes, adjusting the pressure within said system until a maximum number of striations are present in said glow discharge, directing a stream of halogenated hydrocarbon probe gas into association with suspected portions of said high vacuum system, and observing any change which occurs in the color of said glow discharge and the number of striations therein.

11. The method of detecting leaks in a high vacuum system which comprises placing an electrical discharge tube in communication with said system, said tube having spaced metallic electrodes formed of a material capable of producing a weak purple, glow discharge having a maximum number of striations in normal air at a high vacuum but which will react with a halogenated hydrocarbon probe gas to produce a characteristic green glow discharge having an increased number of striations when the pressure within said discharge tube is between approximately 15 millimeters to 50 microns of mercury, maintaining such a pressure within said vacuum system, applying an electric current to said electrodes of between approximately 10 to 25 milliamperes, adjusting the pressure within said system until a maximum number of striations is present in said glow discharge, and directing a stream of halogenated hydrocarbon probe gas into association with suspected portions of said high vacuum system, and observing any change which occurs in the color of said glow discharge and the number of striations therein.

12. A leak detector for high vacuum systems comprising an electrical discharge tube, spaced metallic electrodes in said tube comprising at least one metal selected from the group consisting of nickel, copper, cobalt, iron, silver, and gold, means for maintaining the pressure within said discharge tube between approximately 15 millimeters to 50 microns of mercury, means for applying an alternating electric current of between approximately 10 to 25 milliamperes to said electrodes, probe means for directing a flow of a halogenated hydrocarbon vapor toward the possible sources of leakage in said high vacuum system, and means for causing a flow of gas from the vacuum system being checked for leaks through said discharge tube, so that any probe gas entering the vacuum system through a leak therein will be carried into said discharge tube and the discharge glow, which normally under the conditions described will be a weak purple, will assume a characteristic green color.

13. A leak detector for high vacuum systems comprising an electrical discharge tube, spaced metallic electrodes in said tube formed of a material selected from the group consisting of nickel, copper, cobalt, iron, silver, and gold capable of reacting with a halogenated hydrocarbon probe gas to give a characteristic green striated glow discharge at a high vacuum, means for delivering an electric current to said electrodes, and means for causing a flow of gas from the vacuum system being checked for leaks through said discharge tube.

14. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air but which are capable of reacting with a halogenated hydrocarbon probe gas to give a characteristic green glow discharge when the pressure within said discharge tube is between approximately 15 millimeters to 50 microns of mercury, means for maintaining such a pressure within said discharge tube, means for delivering an electric current to said electrodes, and means for causing a flow of gas from the vacuum system being checked for leaks through said discharge tube.

15. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air but which are capable of reacting with a halogenated hydrocarbon probe gas to give a characteristic green glow discharge when the pressure within said discharge tube is between approximately 15 millimeters to 50 microns of mercury, means for maintaining such a pressure within said discharge tube, means for causing an alternating electric current of between approximately 10 to 25 milliamperes to flow between said electrodes in said tube, and means for causing a flow of gas from the vacuum system being checked for leaks through said discharge tube.

16. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air at a high vacuum but which will react with a halogenated hydrocarbon probe gas to produce a characteristic green glow discharge in a high vacuum, a source of alternating current capable of delivering to said electrodes a current of between approximately 10 and 25 milliamperes, means for limiting the current flow in said discharge tube so that the voltage drop across said tube is between 700 and 1500 volts, and means for causing a flow of gas from the vacuum system being checked for leaks through said discharge tube.

17. The leak detector for high vacuum systems defined in claim 16 in which said electrodes are formed of nickel.

18. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air at a high vacuum but which will react with a halogenated hydrocarbon probe gas to produce a characteristic green glow discharge in a high vacuum when the pressure within said discharge tube is between approximately 15 millimeters to 50 microns of mercury, a vacuum pump assembly associated with said discharge tube adapted to maintain such a pressure therein when said tube is in communication with the system being checked for leaks, means for delivering an electric current to said electrodes, and means for causing a flow of gas from the vacuum system being checked for leaks through said discharge tube.

19. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air at a high vacuum but which will react with a halogenated hydrocarbon probe gas to produce a characteristic green glow discharge in a high vacuum when the pressure within said discharge tube is between approximately 15 millimeters to 50 microns of mercury, a vacuum pump assembly associated with sadi discharge tube adapted to maintain such a pressure therein when said tube is in communication with the system being checked for leaks, a transformer adapted to be connected to a source of alternating current and to deliver to said electrodes a current of between approximately 10 and 25 milliamperes, means for limiting the current flow in said discharge tube, and means for causing a flow of gas from the vacuum system being checked for leaks through said discharge tube.

20. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air at a high vacuum but which are capable of reacting with a halogenated hydrocarbon probe gas to give a characteristic green glow discharge, means for operatively connecting said discharge tube to a vacuum system to be checked, pumping mechanisms associated with said discharge tube adapted to maintain the pressure in said discharge tube at approximately one millimeter of mercury so that said glow discharge has a maximum number of striations and at the same time to cause a flow of gas from said system through said discharge tube, and means for delivering an alternating current to said tube that is limited to between approximately 10 and 25 milliamperes, so that when a halogenated hydrocarbon probe gas is present the number of striations in said glow discharge is increased.

21. The leak detector for high vacuum systems defined in claim 20 in which said electrodes are formed of nickel.

22. A leak detector for high vacuum systems comprising an elongated electrical discharge tube having a central portion of reduced diameter, spaced metallic electrodes at opposite ends of said discharge tube formed of a material selected from the group consisting of nickel, copper, cobalt, iron, silver, and gold capable of producing a weak purple, glow discharge in normal air at a high vacuum but which will react with a halogenated hydrocarbon probe gas to produce a characteristic green glow discharge, a booster pump connected to one end of said discharge tube, a diffusion pump connected to said booster pump, means for connecting said diffusion pump to the vacuum system being checked for leaks, a mechanical pump connected to the opposite end of said discharge tube for maintaining the pressure within said discharge tube between approximately 15 millimeters to 50 microns of mercury, a source of alternating current capable of delivering to said electrodes a current of between approximately 10 and 25 milliamperes, and means for limiting the current flow in said discharge tube.

23. A leak detector for high vacuum systems comprising an electrical discharge tube, spaced metallic electrodes in said tube comprising at least one metal selected from the group consisting of nickel, copper, cobalt, iron, silver, and gold, means for delivering an electric current to said electrodes, probe means for directing a flow of a halogenated hydrocarbon vapor toward the possible sources of leakage in said high vacuum system, and means for causing a flow of gas from the vacuum system being checked for leaks through said discharge tube, said electric current being sufficient to cause the discharge glow to take on a green color with presence of said halogenated hydrocarbon vapor within said discharge tube.

24. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air at a high vacuum but which will react with a halogenated hydrocarbon probe gas under such conditions to produce a characteristic green glow discharge, means for maintaining the pressure within said discharge tube between approximately 15 millimeters to 50 microns of mercury, means for applying an alternating electric current of between approximately 10 to 25 milliamperes to said electrodes, probe means for directing a flow of a halogenated hydrocarbon vapor toward the possible sources of leakage in said high vacuum system, and means for causing a flow of gas from the vacuum system being checked for leaks through said discharge tube, so that if leaks are present in said vacuum system, said probe gas will be present in said discharge tube and will cause the formation of said green glow discharge.

25. A leak detector for high vacuum systems comprising an electrical discharge tube, spaced metallic electrodes in said tube formed of a material selected from the group consisting of nickel, copper, cobalt, iron, silver, and gold capable of producing a weak purple, glow discharge in normal air at a high vacuum but which will react with a halogenated hydrocarbon probe gas to produce a characteristic green glow discharge under such conditions, a vacuum pump assembly associated with said discharge tube adapted to maintain the pressure therein between approximately 15 millimeters to 50 microns of mercury when said tube is in communication with the system being checked for leaks, a transformer adapted to be connected to a source of alternating current and to deliver to said electrodes a current of between approximately 10 and 25 milliamperes, probe means for directing a flow of a halogenated hydrocarbon vapor toward the possible sources of leakage in said high vacuum system, means for limiting the current flow in said discharge tube so that the voltage drop across said tube is between 700 to 1500 volts, and means for causing a flow of gas from the vacuum system being checked for leaks through said discharge tube.

26. A leak detector for high vacuum systems comprising an electrical discharge tube disposed in communication with said system, spaced metallic electrodes in said tube comprising at least one metal selected from the group consisting of nickel, copper, cobalt, iron, silver, and gold, means for delivering an electric current to said electrodes, and probe means for directing a flow of a halogenated hydrocarbon vapor toward the possible sources of leakage in said high vacuum system, so that if said vapor enters said vacuum system, it will be brought into association with said spaced metallic electrodes and the normally weak purple glow discharge in said tube will take on a characteristic green color.

27. The method of detecting leaks in a high vacuum system which comprises placing an electrical discharge tube in communication with said system, said tube having spaced metallic electrodes formed of a material capable of producing a weak purple, glow discharge having a maximum number of striations in normal air at a high vacuum but which will react with a halogenated hydrocarbon probe gas to produce a characteristic green glow discharge having an increased number of striations, applying an electric current to said electrodes, adjusting the pressure within said system until a maximum number of striations are present in said glow discharge and directing a stream of halogenated hydrocarbon probe gas into association with suspected portions of said high vacuum system and observing any change in said glow discharge.

References Cited in the file of this patent

UNITED STATES PATENTS

| | | |
|---|---|---|
| 274,295 | Edison | Mar. 20, 1883 |
| 968,677 | Moore | Aug. 30, 1910 |
| 1,163,989 | Farnsworth | Dec. 14, 1915 |
| 1,377,282 | Schafer | May 10, 1921 |
| 1,851,360 | Jacobsen | Mar. 29, 1932 |
| 1,910,755 | De Groote et al. | May 23, 1933 |
| 2,504,772 | White | Apr. 18, 1950 |
| 2,526,038 | Nelson | Oct. 17, 1950 |
| 2,582,647 | Morgan | Jan. 15, 1952 |
| 2,620,453 | Beese et al. | Dec. 2, 1952 |